United States Patent
Kull et al.

(10) Patent No.: US 6,301,532 B1
(45) Date of Patent: Oct. 9, 2001

(54) METHOD FOR CORRECTION OF A SIGNAL OF AT LEAST ONE SENSOR ON THE BASIS OF WHICH A PATH CURVE CAN BE DETERMINED, ON WHICH THE VEHICLE IS MOVING

(75) Inventors: Wolfgang Kull, Neuhausen; Wolfgang Lauer, Heilbronn; Thomas Reichmann, Kirchheim u. Teck, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/466,304

(22) Filed: Dec. 17, 1999

(30) Foreign Application Priority Data

Dec. 17, 1998 (DE) .............................................. 198 58 297

(51) Int. Cl.[7] ..................................................... G06F 19/00
(52) U.S. Cl. .............................. 701/34; 701/96; 701/301; 702/104
(58) Field of Search ................................. 701/1, 29, 93, 701/96, 211, 301, 34; 702/85, 92, 93, 94, 95, 104; 180/167, 168, 169, 170; 340/435, 436, 903

(56) References Cited

U.S. PATENT DOCUMENTS

| | | | |
|---|---|---|---|
| 4,727,492 | 2/1988 | Reeve et al. | 180/169 |
| 5,745,870 | * 4/1998 | Yamamoto et al. | 701/96 |
| 5,878,361 | * 3/1999 | Sekine et al. | 701/96 |
| 5,955,967 | * 9/1999 | Yamada | 701/96 |
| 5,964,822 | * 10/1999 | Alland et al. | 701/96 |
| 5,999,874 | * 12/1999 | Winner et al. | 701/96 |
| 6,055,467 | * 4/2000 | Mehring et al. | 701/211 |
| 6,141,619 | * 10/2000 | Sekine | 701/211 |

FOREIGN PATENT DOCUMENTS

| | | |
|---|---|---|
| 3686213 T2 | 1/1993 | (DE) . |
| 39 23 458 C2 | 3/1995 | (DE) . |
| 19736965 C1 | 5/1999 | (DE) . |
| 7-120555 | 5/1995 | (JP) . |
| 10-132939 | 5/1998 | (JP) . |

* cited by examiner

Primary Examiner—Gary Chin
(74) Attorney, Agent, or Firm—Crowell & Moring LLP

(57) ABSTRACT

The present invention relates to a method for correction of a signal of at least one sensor, on the basis of which a path curve can be determined, on which the vehicle is moving, with the vehicle having a device by means of which the environment of the vehicle can be identified, and with the correction of the signal of the at least one sensor being carried out in that, at at least one point in time, the object location expected at at least one further point in time of an object which is identified as being stationary is determined on the basis of the vehicle speed and of the signal of the at least one sensor, and in that, at the at least one further point in time, the object location of the object which is identified as being stationary is recorded, with a correction of the signal of the at least one sensor being carried out on the basis of the discrepancy between the expected object location and the recorded object location.

2 Claims, 4 Drawing Sheets

METHOD FOR CORRECTION OF A SIGNAL OF AT LEAST ONE SENSOR ON THE BASIS OF WHICH A PATH CURVE CAN BE DETERMINED, ON WHICH THE VEHICLE IS MOVING

CROSS REFERENCE TO RELATED APPLICATIONS

Priority is claimed under 35 U.S.C. §119 with respect to German Patent Application No. 198 58 297.8-32 filed on Dec. 17, 1998.

BACKGROUND OF THE INVENTION

The present invention relates to a method for correcting a signal of at least one sensor, on the basis of which a path curve can be determined, on which the vehicle is moving.

Systems are known in which the environment of a vehicle is evaluated—for example by means of radar beams—in order to control the speed of the vehicle. A further possible aim may also be for automatically steering the vehicle without any action by the vehicle driver. The orientation process involves sensing both objects which are identified as being stationary in the environment and, other vehicles. In this case, it is important to identify whether other vehicles are travelling in the same lane as one's own vehicle, or in an adjacent lane. If the lane is incorrectly assigned, it is possible for the driver to be given an unnecessary warning or for the vehicle to be braked unnecessarily when a slower-moving vehicle on an adjacent lane is identified as driving in the same lane. On the other hand, the vehicle driver may be warned, or the vehicle may be braked, too late or not at all if a vehicle travelling more slowly in front in the same lane is identified as driving in the adjacent lane. It is thus important to assign a vehicle's own direction of travel correctly with respect to other objects. To this end, it is necessary to identify with as little error as possible the path curve on which the vehicle is moving.

The object of the present invention is to carry out a correction of a signal on the basis of which a path curve can be determined on which the vehicle is moving.

SUMMARY OF THE INVENTION

This object is achieved according to the invention in that the vehicle has a sensing device by means of which the environment of the vehicle can be identified, and in that the correction of sensor signal is carried out such that, at at least one point in time, the object location expected at at least one further point in time of an object which is identified as being stationary is determined on the basis of the vehicle speed and of the signal of the sensor, and in that, at the one further point in time, the object location of the object which is identified as being stationary is recorded, with a correction of the signal of the one sensor being carried out on the basis of the discrepancy between the expected object location and the recorded object location.

This method advantageously allows compensating for static errors such as those arising from displacement of the vehicle's lane. Since the expected object location at a further point in time is determined, starting from a first point in time, by means of the vehicle speed and the signal of the at least one sensor, this object location can be compared with the object location measured, that is to say recorded, at the further point in time.

In one embodiment of this invention, the device identifies the environment by means of radar beams.

Such devices are known and are already being tested. Such devices allow the environment in terms of moving and stationary objects to be identified well. Furthermore, such devices are preferably used in the systems described initially, in which vehicle speed control and/or steering control are intended to be carried out without any action by the vehicle driver. The device can then be used not only for control purposes, but also for adjusting of the sensor or sensors which determine the path curve of the vehicle.

Also, at least one parameter of a path curve can be determined for the discrepancy between the curve of the expected object locations and the recorded object locations. An offset for the signal of the sensor can be determined on the basis of this parameter.

The use of a plurality of object locations makes it possible to compensate for statistical fluctuations, which express themselves as incorrect measurement results. If, for example, the path curve is described by an n-th order polynomial, an overdefined equation system is obtained if the number of, object locations used to calculate the parameters is greater than n+1. It has been found to be advantageous to assume a 2nd order polynomial for the path curve. In this case, only the parameters for the second-order term need be determined by suitable selection of the coordinate system. The overdefined equation system may be evaluated, for example, using least-square error methods.

This parameter can be determined for a set of expected and recorded object locations. Furthermore, specific parameters can be averaged for a plurality of sets of expected and recorded object locations.

This allows statistical fluctuations in the determination of the parameters to be compensated for.

The parameter for a set of expected and recorded object locations can be determined with a weighting in the averaging, at least if a certain limit value is exceeded by the parameter.

This weighting makes it possible to analyse the reliability of the parameter determined for a set of expected and recorded object locations. If the value of the specific parameter would result in a correspondingly large correction, this parameter can be taken into account, for example, with a low weighting, in order to wait until it is clear whether this parameter value is confirmed by further sets of expected and recorded object locations. This allows errors to be compensated for in an advantageous manner if object locations identified from successive measurements in time are assigned to a specific object for which object locations have already been determined. In this case, however, there may be a plurality of objects which are located comparatively close to one another and may be concealed for individual measurements, so that the associated object locations did not actually correspond to the same object.

The weighting can also be carried out, such that the parameter is taken into account with reduced weighting in the averaging if the parameter exceeds a certain limit value. The parameter may even be ignored if it exceeds limit value. It is likewise also possible to provide a factor in the weighting whose profile can be differentiated continuously, in which case this factor reduces as a function of the value of the parameter in relation to a certain limit value.

When a limit is exceeded by an error ($\Delta y$) which results from a discrepancy between the path curve of the expected and/or recorded object locations and the path curve calculated by means of the parameter, the parameter can be taken into account with a weighting for the averaging.

This advantageously allows account to be taken of the extent to which discrepancies occur between the mean value, which is obtained on the path curve on the basis of the one calculated parameter, and the expected and/or recorded object locations. If the error is excessive, the parameter may be given, for example, a correspondingly lower weighting.

The weighting may be applied, for example, by taking account of the parameter in the averaging with a reducing weighting if the error Δy exceeds the limit. The parameter may even be ignored if the error Δy exceeds the limit. It is likewise also possible to provide a factor in the weighting whose profile can be differentiated continuously, in which case this factor reduces as a function of the value of the error Δy in relation to a limit.

A statistical error analysis could also be carried out in the averaging process, with the correction value becoming invalid and/or a warning signal being output if the error exceeds a limit value.

In this way, it is advantageously possible to identify whether the values of the parameter determined for individual sets of expected and recorded object locations differ excessively from one another, so that uncertainties may exist with regard to the reliability of the resultant correction value.

The parameter within a set may also be determined only when the maximum magnitude of the change in the signal of a sensor during this set is less than a specific threshold value.

If the signal of the sensor changes to be above a threshold value during the period of the evaluation, the recorded object locations change with respect to the expected object locations determined at earlier points in time, just by virtue of the change in the signal. However, since these are not changes arising due to static errors, for example on the basis of a change in the vehicle lane, the evaluation within this set is in this case interrupted. The specific threshold value may be, for example, 5°, if the signal of the sensor is the steering angle.

The parameter within a set can be determined only when the maximum magnitude of the sensor signal during this set is less than a specific limit value.

It has been found that the determination of the parameters is subject to errors above a specific limit value of the signal of a sensor. It is thus advantageous for the determination of the parameter not to be carried out if, for example, the signal of the sensor corresponds to the vehicle track angle and its magnitude is greater than a specific limit value. The specific limit value may, for example, be 7.5° min this case. For example, when driving round a tight curve, the curvature error caused by a track angle error may be less than the measurement accuracy of the sensor which is used to detect the objects. In this case, offset error identification is then no longer possible.

Furthermore, the signal evaluation is simplified since it is possible to ignore, for example, dynamic influences such as the self-steering gradient in dynamic equations for these driving conditions.

The sensor signal can represent the track angle of the vehicle, which is derived from the measured steering angle, with the correction being carried out by adding an offset.

The steering angle is a variable which can be measured comparatively easily. It is thus possible to use this measurement variable to derive the signal which represents the track angle of the vehicle.

A warning signal can also be output when the magnitude of the determined offset value exceeds a specific threshold.

In this case, it is possible to confirm that an error has occurred since, for example, the vehicle track has been displaced so far that this must be corrected.

The distance to the object can be identified as being stationary when greater than a specific minimum distance.

The distance to the object can also be identified as being stationary when less than a specific maximum distance.

A value of about 15 m has been found to be suitable for the minimum distance, and a value of about 120 m for the maximum distance. At distances above the maximum distance, the changes in the angles at which the object which is identified as being stationary is observed are excessively low. The change in these angles is too great at an excessively short distance (less than the minimum distance). It has been found to be particularly advantageous to define the distance value to be between 30 m and 70 m.

The path curve can also be determined from a minimum number of expected and recorded object locations, and a set of expected and recorded object locations includes a minimum number of expected and recorded object locations.

This results in a value with a statistically higher confidence level.

BRIEF DESCRIPTION OF THE DRAWINGS

An exemplary embodiment of the invention is illustrated in more detail in the drawing, in which.

DETAILED DESCRIPTION OF THE PREFERRED EMBODIMENT

Figure 1A:
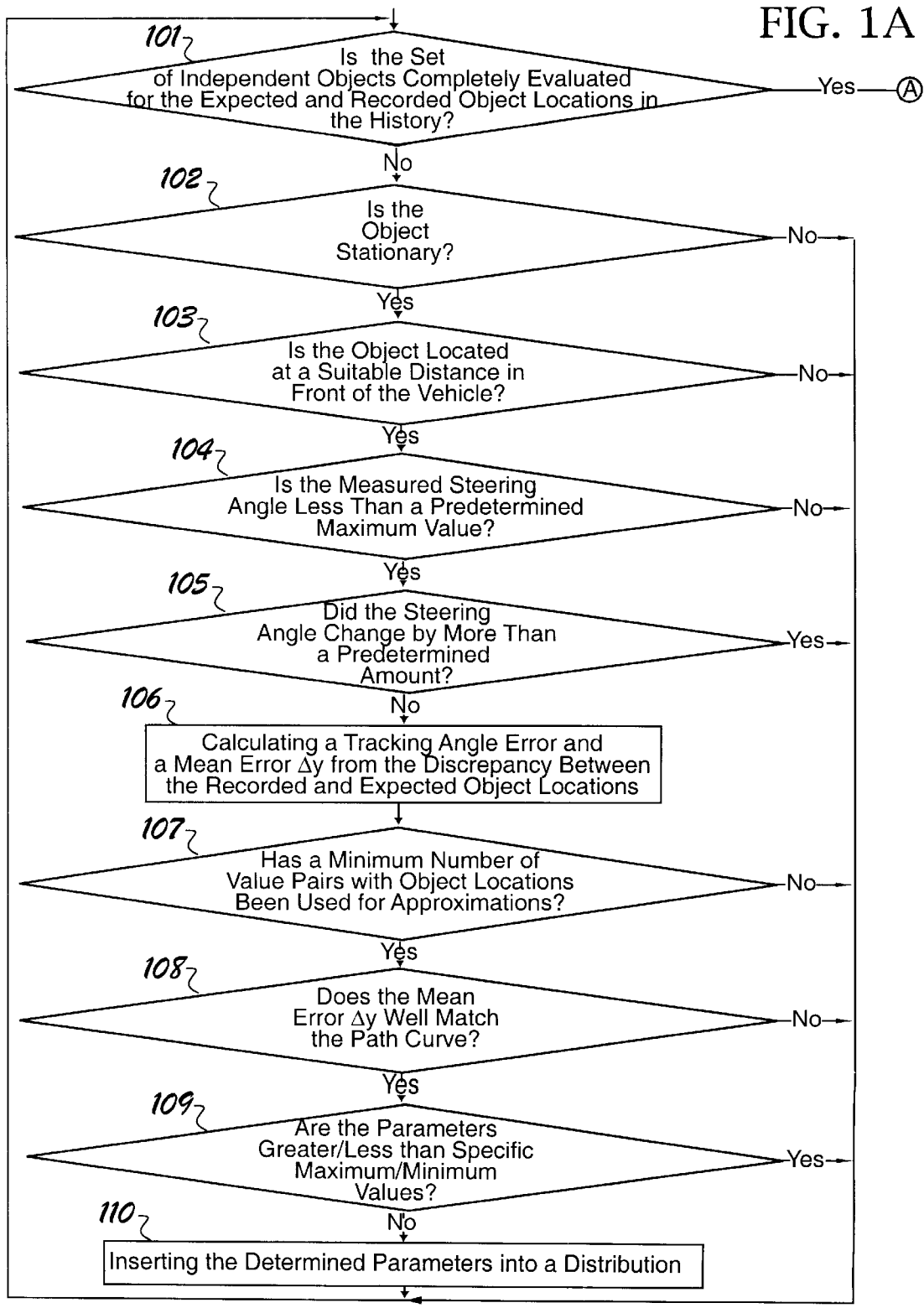
FIGS. 1A and 1B show flowcharts depicting the method according to the invention.

According to FIG. 1A, a correction value is first of all calculated in steps 101 to 110, and is statistically averaged and processed further with other determined correction values, in steps 111 to 115.

Figure 3:
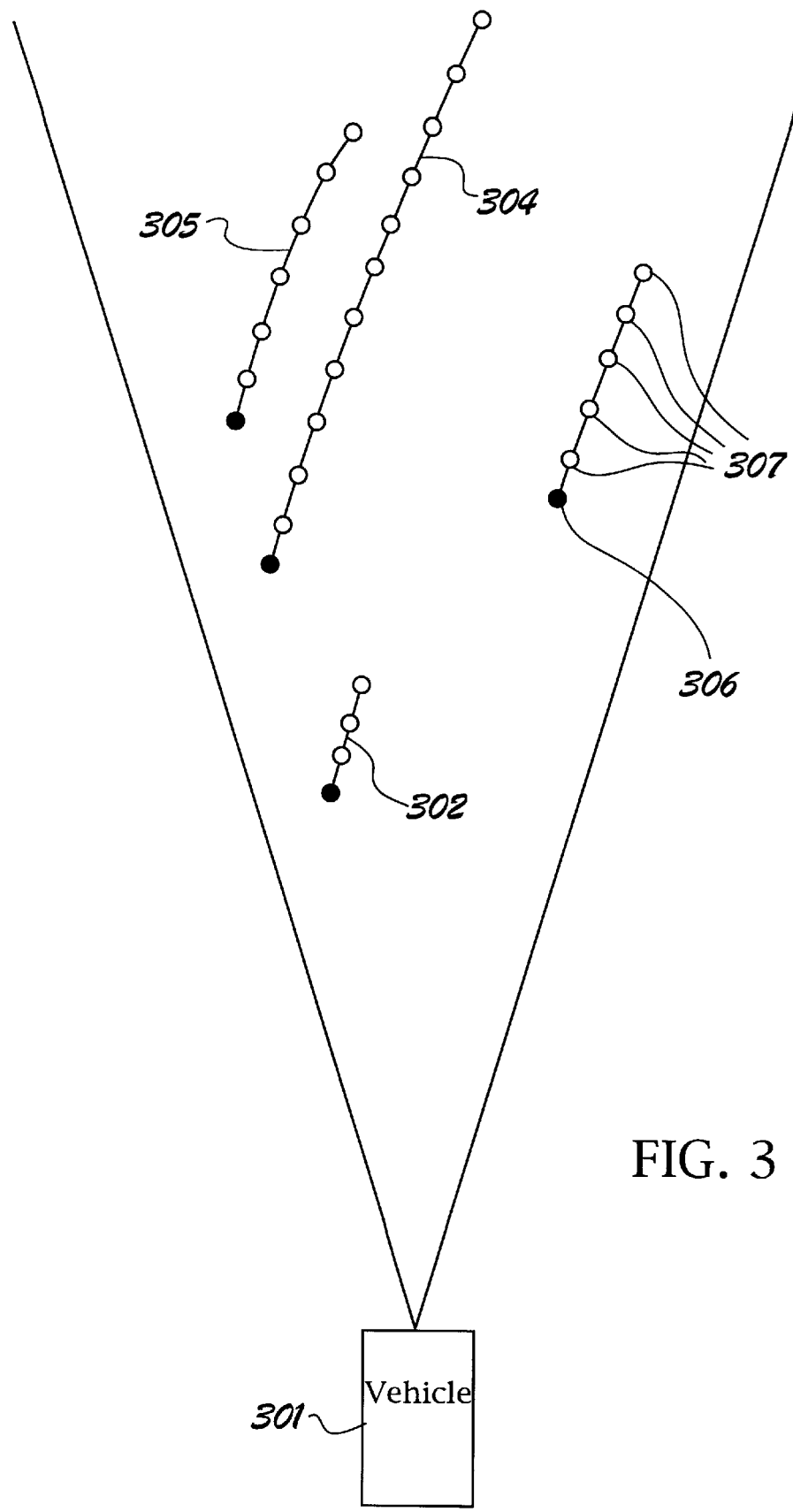
FIG. 3 shows a plurality of objects, with object locations in the history.

First of all, a check is carried out in step 101 to determine whether a set of independent objects with the respective expected and recorded object locations (positions) in the history has not yet been completely evaluated (FIG. 3). If these objects, that is to say the object tracks resulting from the individual sets of recorded object locations, have not yet been completely evaluated, the process goes to step 102, in which a check is carried out to determine whether the processed object has been identified as being stationary. The steps 103 to 110 which follow this are then carried out for each object which is identified as being stationary, with the associated history (expected and recorded object locations of an object from previous measurements).

If this is the case, the process goes to step 103, in which a check is carried out to determine whether the object is located at a suitable distance in front of the vehicle. This object may be, for example, between 30 m and 70 m. If this excessively limits the number of objects, this distance range may be extended, for example, to cover the distance from 15 m to 120 m. The approximate distance must therefore be located within a specific maximum distance and beyond a specific minimum distance.

Thus, if the object is located in a corresponding distance range in front of the vehicle, the process goes to step 104 in which a check is carried out to determine whether the measured steering angle is less than a predetermined maximum value which may be, for example, 7.5°. The magnitude of the variable to be corrected during the detection of the expected and recorded object locations in a set of expected and recorded object locations should thus be less than a specific limit value.

If this is the case, the process goes to step 105, in which a check is carried out to determine whether the steering angle has changed by more than a specific amount, for example 5°, during the determination of the recorded and expected object locations of a set of expected and recorded object locations. The magnitude of the change in the variable to be corrected, during the detection of the expected and recorded object locations in a set of expected and recorded object locations, should thus be less than a specific limit value.

In step 106, the track angle error is calculated from the discrepancy between the recorded object location and the expected object location determined previously for the present point in time. At the same time, expected object locations for future points in time are calculated by means of the vehicle speed and the measured track angle. The track angle error may also be calculated by collecting the data in a set and evaluating the data using least-square error methods.

Figure 2:
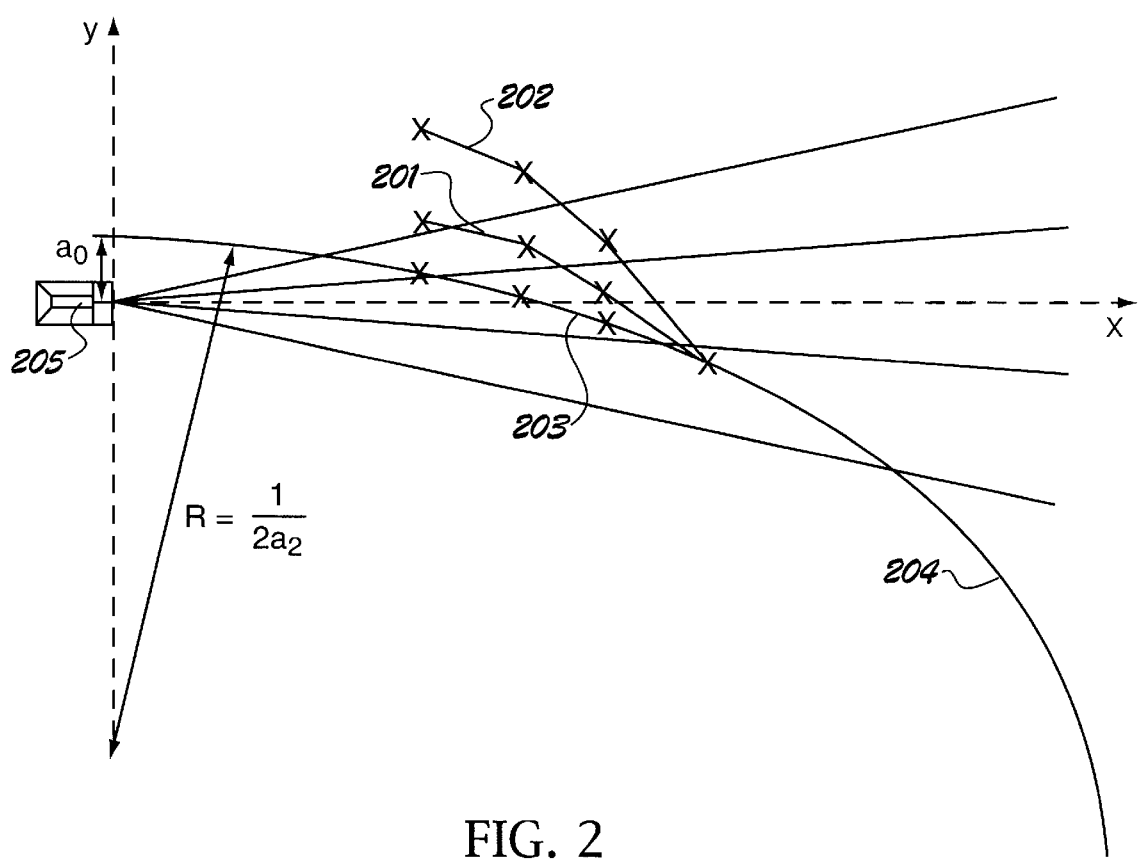
FIG. 2 shows an outline illustration of the path curves of the vehicle for determining the parameter or parameters.

FIG. 2 shows an outline illustration of the path curves of the vehicle 205, in order to determine the parameter or parameters. The correction in step 106 When the steering angle is measured will be described in the following text. For objects which are identified as being stationary, errors in the steering angle can be determined and corrected by comparing the recorded object tracks with the current steering angle. To do this, a difference track $f_{Dif}$ 203 can be formed from the recorded (real) object track $f_R$ 201 and the expected object track $f_E$ 202, from whose curvature the current steering angle error can be determined.

The recorded object track $f_R$ 201 comprises a number of measured values for the distance $x_i$ and the offset $y_i$. With regard to the expected object track $f_E$ 202, it is assumed that the object is moving on a circular path, with the curvature of the steering angle $a_{2,E}$, through the detection area of the radar sensor. Based on the last calculated object track point (expected object location), the current expected value (expected object location) is determined using the current steering angle and an approximation parabola without any linear term, as follows:

$$f_E(x_{n,E}): y_{n,E} = a_{2,E}*(x_{n,E})^2 + a_{0,E}$$

Since only the variables $a_{2,E}$ and $x_{n,E}$ are given, $a_{0,E}$ must be determined using the previous support point.

$$a_{0,E} = y_{n-1,E} - a_{2,E}*(x_{n-1,E})^2$$

This then results in the following solution for $y_{n,E}$:

$$y_{n,E} = a_{2,E}*(x_{n,E})^2 + y_{n-1,E} - a_{2,E}*(x_{n-1,E})^2$$

or $$y_{n,E} = a_{2,E}*((x_{n,E})^2 - (x_{n-1,E})^2) + y_{n-1,E}.$$

The different track $f_{Dif}$ has the same x-values as $f_R$ and $f_E$.

$$x_{i,Dif} = x_{i,R} = x_{i,E}$$

The y-values are obtained from the difference between the two tracks $f_R$ and $f_E$.

$$y_{i,Dif} = y_{i,R} - y_{i,E}$$

In a further step, the difference track $f_{Dif}$ is approximated, for example, by means of a 2nd order polynomial of the form:

$$f_{approx}(x): y = a_2*x^2 + a_1*x + a_0$$

The parameter $a_0$ now indicates the distance between the path curve and the vehicle longitudinal axis (see FIG. 2). The linear term $a_1$ is 0 in normal driving conditions since, otherwise, the vehicle would drift. The parameter $a_2$ indicates the curvature of the difference curve (FIG. 2). The function to be approximated is thus simplified, at the same time increasing the stability with regard to stray measurements, to the following form:

$$f_{approx}(x): y = a_2*x^2 + a_0$$

The parameters are determined, for example, using the least-square error methods, such that the object locations (value pairs $x_{i,Diff}$ and $y_{i,Diff}$) are approximated as optimally as possible to the path curve obtained from the parameters.

By way of example, up to 50 value pairs with a minimum distance difference of 3 m may be used for the approximation.

If required, these value pairs may have weightings of different strength.

A mean error $\Delta y$ may also be determined for the approximation. The error represents the mean error of the value pairs from the approximated path curve in the y-direction. The mean square error is expediently calculated. If the calculation complexity is too great, the mean weighted error may also be determined.

The signal of the at least one sensor may now be corrected by means of at least one specific parameter for the path curve.

For example, the curvature $a_2$ of the polynomial can now be used to correct the signal of the at least one sensor. The curvature then corresponds to the curvature offset to which the signal and the curvature derived from it are subject.

The specific parameters as well as the conditions in which they have been determined should advantageously then be investigated for plausibility. The following plausibility criteria may be used for this purpose, and can be checked in the subsequent steps:

Corresponding to step 107, a check is carried out to determine whether a minimum number of value pairs with object locations have been used for approximations. This is equivalent to checking that the approximated distance has a minimum length.

Furthermore, the error $\Delta y$ can be evaluated in a step 108, for error analysis. The limit values for error analysis may need to be adapted, depending on the type of calculation. The error indicates how well it has been possible to match the path curve to the value airs. A large error indicates that the indicated parameters, for example $a_2$ and $a_0$, are also subject to major errors.

Furthermore, a check is carried out in step 109 to determine whether the specific parameter or parameters is/are not greater than or less than specific maximum values and minimum values. It is thus advantageously possible to identify stray measurements. $a_2$ and $a_0$ are thus checked here in the above polynomial.

If the parameters tested in steps 108 and 109 infringe the limit values, then this may either lead to the complete measurement of the object not being included in the statistical evaluation or, possibly being included in this evaluation only with a low weighting.

Figure 1B:
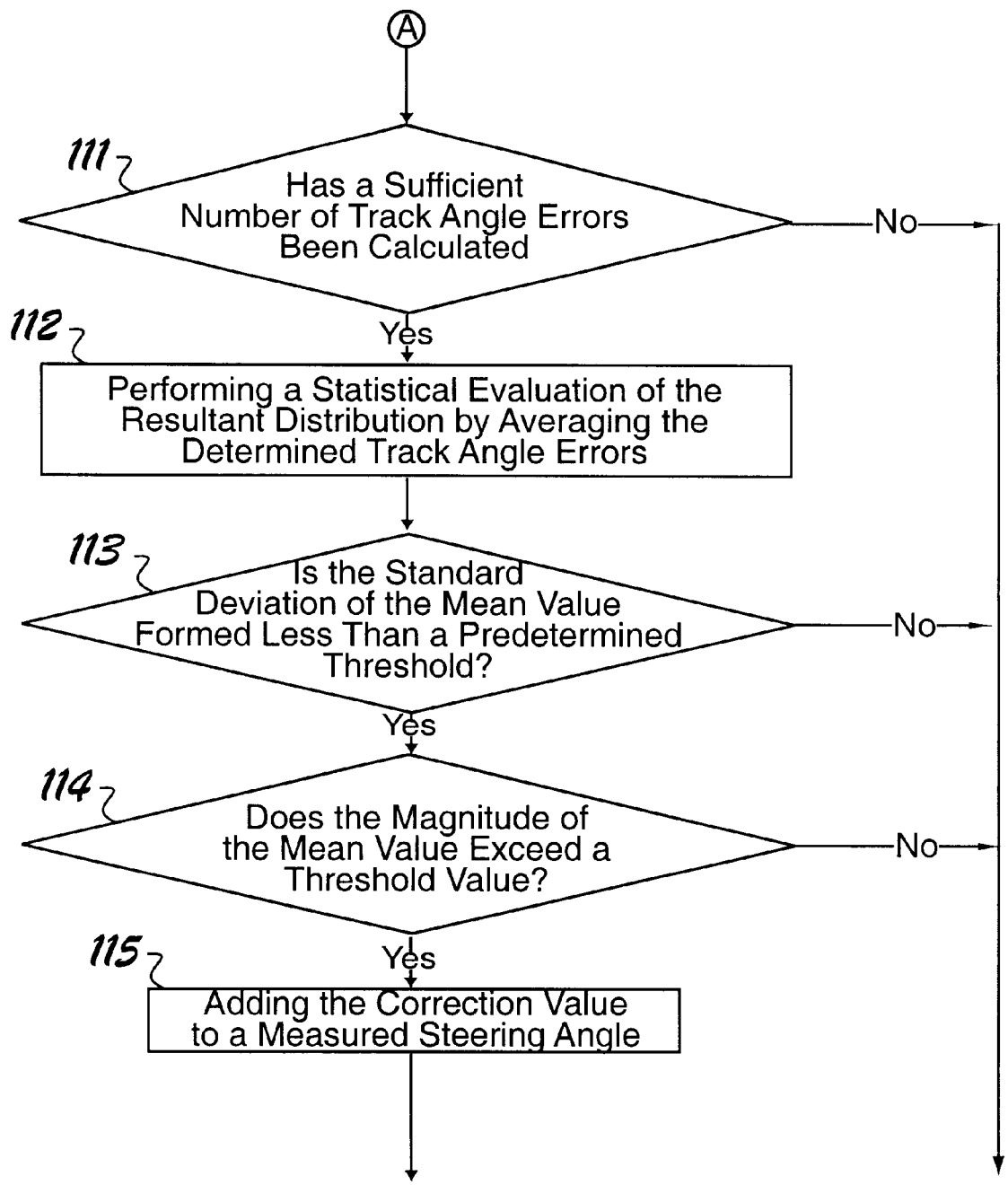

In step 110, the determined parameters are inserted, with an appropriate weighting, into a distribution for statistical evaluation in step 112. From then on, the process continues in step 101 with the next detected object, that is to say with the evaluation of the next set of recorded and expected object locations (object tracks). As illustrated in FIG. 1B, once all the sets of recorded and expected object locations, that is to say all the object tracks, have been processed, the process moves to step 111, in which a check is carried out to determine whether a sufficient number of track angle errors (in the present example $a_2$ values) have been calculated. These track angle errors may have been detected over a lengthy time period.

If a sufficient number have been calculated, a statistical evaluation of the resultant distribution is carried out in step 112, by averaging the determined track angle errors, or variables derived from them. In addition, the standard deviation may be determined. Scattering of the parameters must be expected. If the standard deviation is too great, the parameter (in the example the averaged $a_2$ value) may, for example, be rejected or be included in the calculation with reservations. If the averaged parameters infringe the redetermined limit values, a warning signal is output.

A conversion calculation is thus required in order to allow an offset in degrees to be determined from the determined difference curvature (averaged $a_2$ value), which can then be subtracted from the steering angle as a correction value, in order to achieve a steering angle from which errors have been removed. This conversion calculation to correct the measured steering angle signal may be carried out using the known dynamic equation:

$$R_{dyn} = i_{Steering\ step\text{-}up\ ratio} * 180° * (L_{Wheelbase} + EG_{Self\text{-}steering\ gradient} * \pi * (v_{Self})^2 / 180°) / (\phi_{Steering\ angle} * \pi) \text{ (in metres).}$$

By conversion, it is possible to determine $\phi_{Steering\ angle}$, which corresponds to the offset in degrees, provided $R_{dyn} = 1/(2*a_2)$. Since the variables $i_{Steering\ step\text{-}up\ ratio}$, $L_{Wheelbase}$ (m), $EG_{Self\text{-}steering\ gradient}$ (degrees*s$^2$/m) and $v_{Self}$ (m/s) are known, this does not present any problems. Since any steering angle offset error is independent of the vehicle speed, the equation is simplified to:

$$\phi_{Steering\ angle,\ offset} = 2 * a_2 * i_{Steering\ step\text{-}up\ ratio} * 180° * L_{Wheelbase} / \pi$$

The track angle is represented by the steering angle, taking account of the step-up ratio of the steering drive.

The correction of a rotation rate sensor, which detects the rotation movement of the vehicle to the left and right about the vertical axis, is then carried out, for example, using this correction method from Rotation rates$_{Offset} = a_2 * v_{Self} * 360°/\pi$ (in degrees/s), where $a_2$ corresponds to the difference curvature and $v_{Self}$ to the vehicle speed at the point in time when the difference curvature was determined.

A check is carried out in step 113 to determine whether the standard deviation of the mean value formed is less than a predetermined threshold. If this is the case, the process goes to step 114, in which the mean value of the correction value is checked. If the magnitude exceeds a threshold value, then a warning signal can be output. This correction value is added, in step 115, to a measured steering angle, in order to obtain a signal representing the track angle of the vehicle.

In the described exemplary embodiment, a signal representing the track angle of the vehicle is obtained from the measured steering angle. It can be seen that, using the method according to the invention, all the signals of vehicle-related sensors can be corrected, from which it is possible to derive a prognosis of the path curve on which the vehicle is moving. Such sensors are, for example, the measured track angle, the measured steering angle, the measured rotation rate about the vehicle vertical axis (yaw rate) or the difference between the measured wheel rotation speed signals from wheels on different sides of the vehicle.

Instead of the specifically predetermined limit and threshold values which have been quoted in the exemplary embodiments, the corresponding variables may also be subjected to differentiated weighting of the results in subsequent processing steps, in order to check the plausibility of the result.

FIG. 3 shows a vehicle 301. The resultant detection angle for the radar sensor is shown for this vehicle 301. Sets of recorded object locations (object tracks) from various objects are available for this vehicle, and are denoted by 302, 303, 304, 305. By way of example, the object track 303 shows that the black points correspond to the respective object locations at the current point in time. This is the point 306 in the object track 303. Those points which are shown as a circle are the respective object locations at previous points in time. These points are denoted by 307 in the example of the object track 303.

The foregoing discussion discloses and describes merely exemplary embodiments of the present invention. One skilled in the art will readily recognize from such discussion, and from the accompanying drawings and claims, that various changes and modifications can be made therein without departing from the spirit and scope of the invention as defined in the following claims.

What is claimed is:

1. Method for correction of a signal of at least one sensor, the signal being the basis of which a path curve can be determined on which the vehicle is moving, characterized in that the vehicle has a device, for identifying the environment of the vehicle, and in that the correction of the signal of the at least one sensor is carried out at a first time in that, the object location expected at a second time of an object which is identified as being stationary is determined on the basis of the vehicle speed and of the signal of the at least one sensor, and in that, at the second time the object location of the object which is identified as being stationary is recorded, with the correction of the signal of the at least one sensor being carried out on the basis of the discrepancy between the expected object location and the recorded object location.

2. A method for correcting a signal from at least one sensor, wherein the signal from the at least one sensor is used to generate a path curve on which a vehicle is moving, comprising:
   identifying an environment of the vehicle wherein the correction of the signal from the at least one sensor is carried out at a first operating time;
   determining an expected object location of a stationary object with respect to a vehicle location of the vehicle at a second operating time based on a vehicle speed and the signal from the at least one sensor;
   recording an exact object location of the stationary object with respect to the vehicle location at the second operating time; and
   correcting the signal from the at least one sensor based on a discrepancy between the expected object location and the recorded object location.

* * * * *